Oct. 16, 1962  M. W. LOVELAND ETAL  3,058,502
ROTARY TYPE KNIFE PEAR PEELER
Filed Feb. 9, 1961  7 Sheets-Sheet 5

INVENTORS
MALCOLM W. LOVELAND
BRUCE E. COOPER
BY
*Eckhoff & Slick*
*Their* ATTORNEYS

Oct. 16, 1962  M. W. LOVELAND ETAL  3,058,502
ROTARY TYPE KNIFE PEAR PEELER
Filed Feb. 9, 1961  7 Sheets-Sheet 6

INVENTORS
MALCOLM W. LOVELAND
BRUCE E. COOPER
BY
ATTORNEYS

Oct. 16, 1962 M. W. LOVELAND ETAL 3,058,502
ROTARY TYPE KNIFE PEAR PEELER
Filed Feb. 9, 1961 7 Sheets-Sheet 7

INVENTORS
MALCOLM W. LOVELAND
BRUCE E. COOPER
BY
ATTORNEYS

3,058,502
ROTARY-TYPE KNIFE PEAR PEELER
Malcolm W. Loveland, Orinda, and Bruce E. Cooper, Gilroy, Calif., assignors to Atlas Pacific Engineering Company, a corporation of California
Filed Feb. 9, 1961, Ser. No. 88,072
7 Claims. (Cl. 146—43)

This invention relates generally to pear processing machines and more particularly to that portion of the machine designed to accomplish the peeling of the fruit. The processing machine itself is of the type providing for stem coring, seed-cell coring, end trimming, peeling and optionally splitting pears of indiscriminate size, such as is disclosed in the Harrer et al. application Serial No. 766,579, filed October 10, 1958.

It is generally an object of this invention to provide a peeling mechanism which operates in conjunction with coring and trimming mechanisms and which is capable of peeling pears of various sizes and hardness without the necessity of pregrading them.

Another object of our invention is the provision of a rotary cutting mechanism for peeling pears of varying sizes and shapes while these are impaled on a coring spindle.

An additional object of this invention is the provision of a power-operated rotary knife for peeling pears and of a power-operated rotary knife for peeling pears and which is mounted in such a manner that the knife follows the periphery of a pear with sufficient exactitude to trim off only the required thickness of skin, thus conserving as much of the flesh as possible.

Still another object of the invention is to provide a pear peeling mechanism which combines in its operating cycle the dual functions required for peeling an object having a configuration made up of different geometrical shapes.

A further object of our invention is the provision of a rotating knife assembly which is guided in a continuous path approximating the composite arcuate and straight line profile of an irregularly shaped object such as a pear to permit its peeling with the least possible waste of flesh.

A more specific object of the invention is to provide an operating mechanism to guide a rotating pear peeling knife in a composite path of arcuate and linear characteristics, utilizing the arcuate motion derived from an eccentric linkage for following the periphery of the spherical portion of the pear and the linear motion obtained from a reciprocating rod for following the neck portion of the pear.

A more specific object of the invention is the provision of a peeling apparatus for use on a pear processing machine, whereby two reciprocating carriers, having relatively different strokes, provide for the mounting of a cutter apparatus and its associated linkage to impart a partially arcuate and partially linear movement to the cutter apparatus to follow a path substantially corresponding to the profile of a pear.

Another more specific object of the invention is to provide a pear peeling mechanism which operates in conjunction with a processing machine incorporating a finned spindle for impaling the fruit during peeling, coring and trimming operations, and having two reciprocating carriers and an interconnecting linkage which guides the peeling mechanism in a partially arcuate and partially linear path to approximate the contour of a pear, wherein the peeling mechanism is pivotally and slideably mounted on a fixed shaft with a cam pin and slot arrangement providing for lifting the mechanism during a portion of its travel to prevent interference between the peeling cutter and the pear mounting spindle.

A further object of the invention is to provide a rotary cutting device capable of peeling the skin from a fruit such as a pear with a minimum of waste.

An additional and a further object is to provide a rotary cutting head for severing the outer cover from a fruit such as a pear with the severed or cut cover in such physical form as to be readily disposable by conventional sewage disposal means.

Referring to the accompanying drawings.

It should be noted that the figures described above show only a single cutting mechanism as will be described, although in actual use a plurality of such units would be incorporated in a single processing machine for simultaneous operation.

The invention as illustrated in the accompanying drawings covers a power-operated rotary cutter assembly for peeling pears. The assembly incorporates the necessary supporting elements and control linkage required for use in conjunction with a pear processing machine of the type having a coring spindle apparatus on which the pear is positioned and rotated during processing.

General Organization

Since the present invention constitutes primarily an improved peeling mechanism for a pear processing machine such as is disclosed in the Harrer et al. application already mentioned, it is thought advisable to include herein a brief description of the basic processing machine to permit easier understanding of the cooperation and relative functions of the peeling machine. In the following description the numerals from the Harrer et al. application have been increased by adding 1000 thereto and then applied to like parts.

Figure 1:
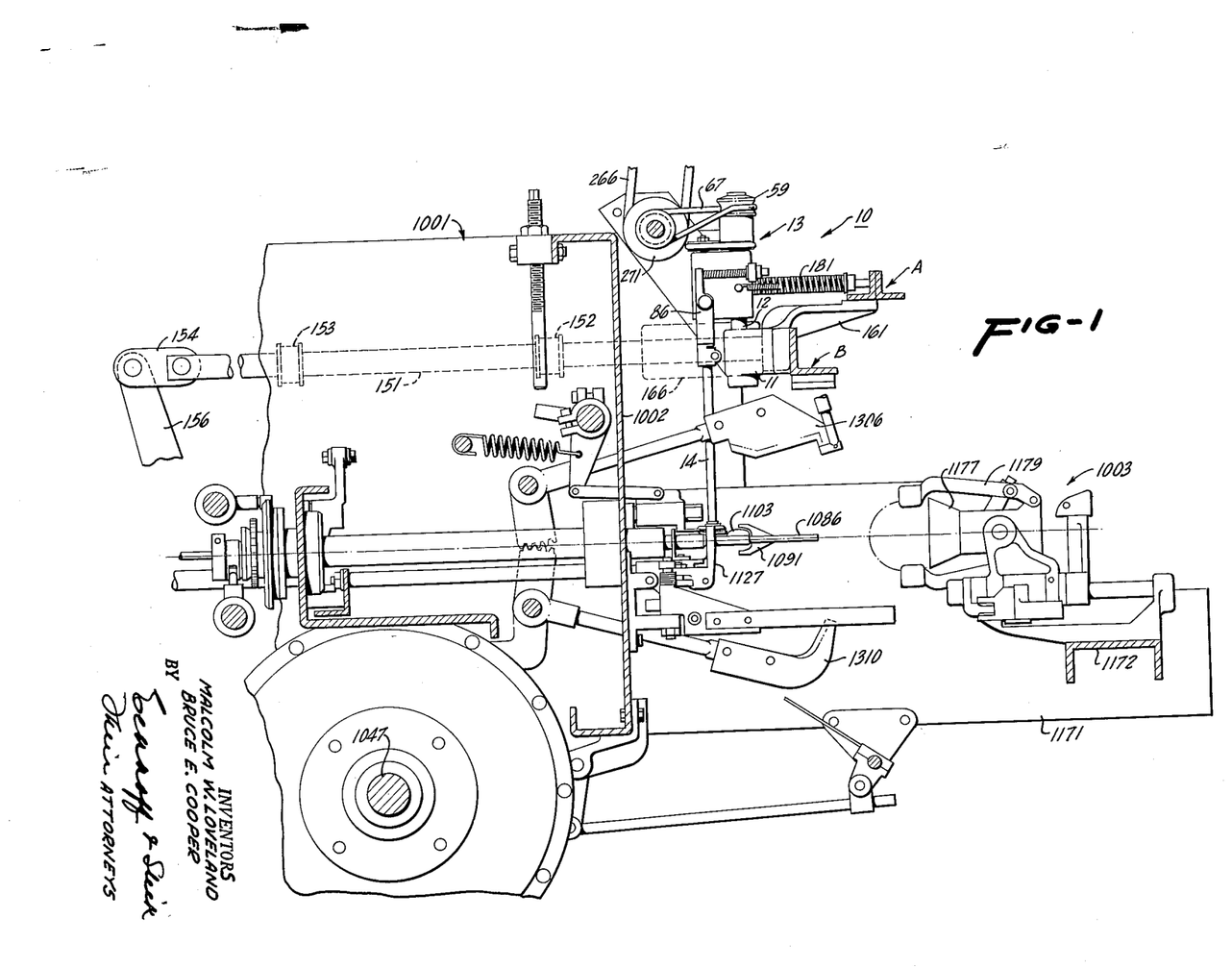
FIGURE 1 is a fragmentary section of a pear processing machine illustrating the position of the peeling mechanism of our invention on such a machine.

In general and referring particularly to FIGURE 1, the pear processing machine comprises a structural frame 1001 providing support for a main power drive shaft 1047 passing transversely between the end support members of frame 1001. A number of cams are affixed to the drive shaft to control the various operations required for processing, through cam followers, lever arms and bell cranks. A vertically disposed forward wall 1002 extends transversely between the end frames and has mounted thereon a plurality of coring spindles 1086, seed pod cutters 1103, trimming knives, halving cutters 1306 and 1310 and position-sensing and push-off mechanisms 1127. Forwardly extending frames 1171 are provided at each end of frame 1001 on which is mounted a transversely extending reciprocating bed 1172 to support a plurality of reciprocating pear feeding and positioning cups 1177 for impaling the fruit on the spindles. Driving and control mechanisms are provided as required to integrate all these elements for operation in their proper sequence.

As is disclosed in the aforementioned Harrer et al. application, journaled in the forward wall and extending forwardly thereof is a hollow spindle 1086 upon which a pear is impaled for the processing operation. The spindle comprises a coring tube having affixed thereto a pair of opposed, tapered keying fins 1091. Coaxially disposed on the rearward section of the spindle for independent rotation thereon is a sleeve provided with a seed-cell pod coring knife. The finned spindle is rotated to turn the pear during peeling and trimming operations, and also when desired to cut a cylindrical seed-cell core as during the processing of pears for cocktail use. The sleeve carrying the seed-cell coring knife is rotated independently to cut the seed-cell pod from the pear body while the spindle and pear impaled thereon are stationary. Disposed with the hollow spindle is a reciprocating stem core plunger to clear the spindle of the pear core. A pair of opposed, co-planar halving knives 1306 and 1310 are mounted to straddle the spindle and are designed to close toward each other to slice the pear in conjunction with the pushoff mechanism 1127.

A pear orienting and feeding assembly 1003 is provided to impale intermittently pears coaxially on the spindle 1086 calyx end first. This feeding assembly includes a pear receiving cup 1177 in which a pear is deposited, whereupon fingers 1174 grip the pear while the mechanism turns from the vertical receiving attitude to a horizontal position to move toward the spindle, impaling the pear thereon. A pear sensing element 1127 is mounted on the wall 1002 adjacent the fins of the spindle to control the aft movement of the feeding mechanism to position a pear properly on the spindle, whereupon the fingers 1179 release the pear and the assembly 1003 returns to its forward position to receive another pear.

Fixed to each end support member of the processing machine frame 1001 are a pair of axially aligned fore and aft bearings 152 and 153 to provide for the slideable mounting of a reciprocating rod 151. A pivoted link member 154 connects the aft end of the rod to a crank lever 156 operated by a cam and follower arrangement controlled by rotation of the main drive shaft. Fastened to the forward end of each of the rods is a bracket fitting 161 supporting a transverse carrier member A. Slideably fitted on the rods between bracket 161 and the forward bearing 152 are a pair of elongated sleeves 166 having offset brackets supporting a second transverse carrier member B located slightly below and behind the first carrier. The structural details and relative movement of these two carriers will be set forth hereinafter during a discussion of the operation of the mechanism.

*The Pear Peeling Assembly*

The pear peeling assembly indicated generally by the numeral 10, comprises essentially a mounting bracket fitting 11 having a bore therethrough for slideably receiving an upwardly extending pivot post 12, a peeling head drive and support member 13 affixed to rod 12 adjacent to and directly above fitting 11, a downwardly disposed rotating cutter assembly 14 pivotally supported on head member 13 and a drive pulley assembly 15 rotatably mounted on an upper stepped down portion of rod 12.

The fitting 11 has a generally cylindrical body portion 21 having integrally formed therewith an offset mounting bracket 22 which is fastened by bolts 23 to vertical flange 24 of transverse angle member 26 of the aft carrier member B. An additional support fitting 27 is also fastened during this assembly procedure to the opposite face of flange 24 for a purpose to be shown later. A vertical bore 28 is provided in body 21 for post 12 to support peeling head member 13 and pulley assembly 15. A generally S-shaped cam slot 31 is cut into the side wall of cylindrical portion 21 for cooperation with a cam follower roller 32 rotatably pinned to post 12. The slot 31 extends approximately 90° around the periphery of body 21, the top of the slot being located on the aft side of the body toward the front wall of the processing machine. Since peeling head member 13 is affixed to post 12, its rotation in a clockwise direction (as viewed from above in FIGURES 3 and 10) will result in axial movement of post 12 together with the parts supported thereby, in downward direction, the amount of vertical travel being determined by the inclination of cam slot 31. This displacement permits the cutter assembly to be in an optimum position for peeling and yet prevents interference between the peeling cutter and pear supporting spindle during peeling of the calyx end of the pear.

The peeling head member 13 is formed with a vertical bore 33 to slip over pivot post 12. An annular groove 34 is cut into rod 12 approximately at its middle to receive a set-screw 35 threaded through wall of member 13 to lock the latter in position on the post 12. Parallel to and a short distance from bore 33 is a second bore 37 to accommodate the driving mechanism for the peeling knife. An upper counterbore 38 is provided to receive upper and lower thrust bearing assemblies 39 and 41 which are held in spaced position by a sleeve 42.

A flexible drive assembly 43 is mounted within the bearings 39 and 41 and comprises an upper flanged shaft 44 joined to a short length of flexible cable 46, the latter having a female fitting 47 swaged onto its lower extremity. Fitting 47 is provided with a coaxial square recess 48 to receive the top end 49 of cutter drive shaft 87. The upper portion 52 of shaft 44 is stepped down and threaded to receive belt pulley 51 fastened thereto by a locking nut. A seal 53 is inserted between shaft 44 and bore 36 for lubrication purposes.

The upper portion 56 of upwardly extending pivot post 12 is stepped down in diameter to receive a pair of spaced thrust bearing assemblies 57 and 58 which provide for rotatably mounting a drive pulley 59. Stepped down portion 56 is threaded at its upper end to receive a washer and nut 61 to hold pulley 59 and bearings 57 and 58 in place.

Drive pulley element 59 is generally cylindrical in shape having a coaxial bore at its lower end to fit post 12 and a counterbore 62 to receive bearings 57 and 58. The upper end of element 59 is formed with upper and lower rims 63 and 64 having an annular V-shaped groove 66 therebetween to receive power transmission belt 67, and a second smaller annular groove 68 is provided at the bottom of element 59 to accommodate a short belt 69 to drive pulley 51 on cutter drive assembly 43. A removable sealing cap 71 fits into the top of pulley 59 to permit lubrication of the bearings.

Figures 4, 5, 7, 8, 9:
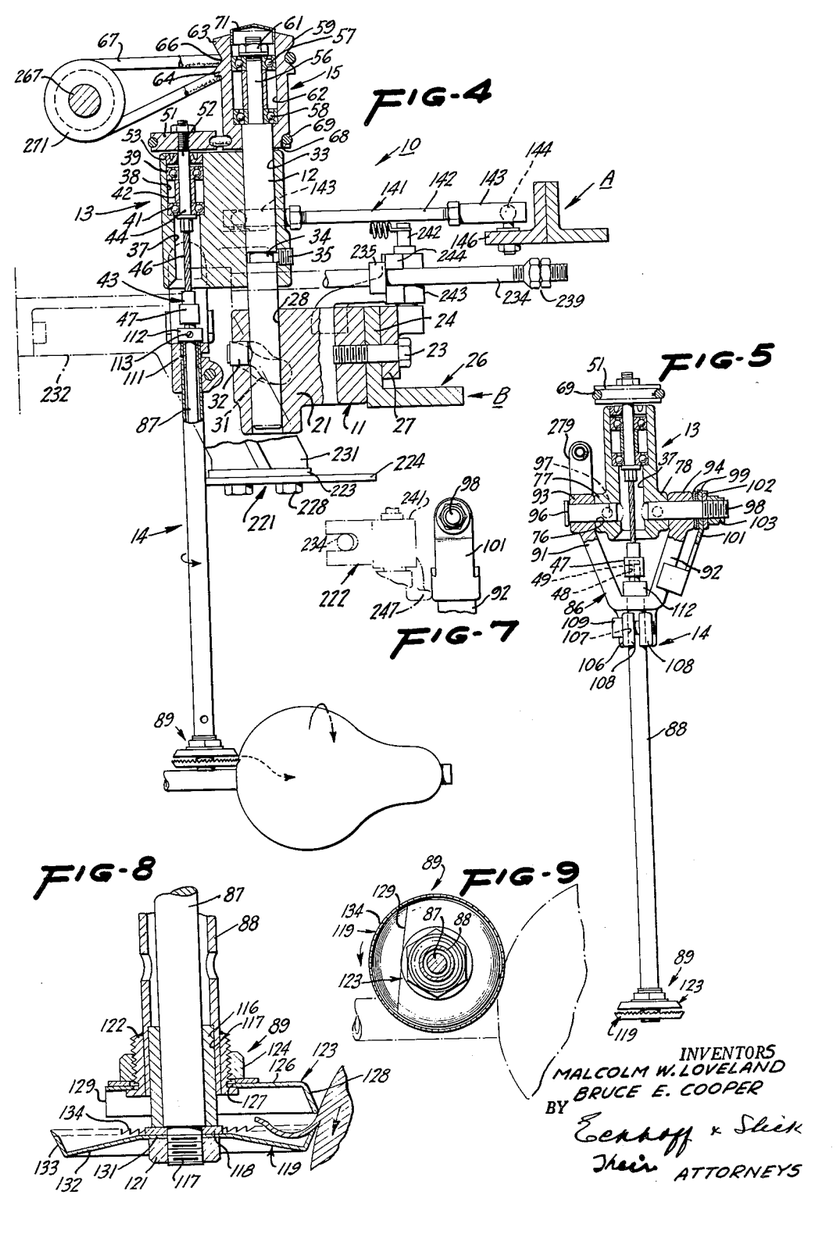
FIGURE 4 is a detailed section of the peeling mechanism taken on line 4—4 of FIGURE 3 and includes the lifting cam means.
FIGURE 5 is an elevation partly in section of the pivotally mounted rotating cutter assembly.
FIGURE 7 is a detail showing the cooperation between the cutter support yoke and the thrust mechanism.
FIGURE 8 is a detail section of the cutter head and its drive shaft.
FIGURE 9 is a plan view showing the position of the cutter at the beginning of the peeling operation.

A transverse bore 76 is provided toward the bottom of peeling head member 13 for pivotal support of the rotating cutter assembly 14 (FIGURE 5). The axis of bore 76 intersects the axis of bore 37 at right angles, and a pair of bosses 77 and 78 are provided at the ends of the bore 76 for additional bearing and lateral positioning of the cutter assembly.

A laterally projecting lever arm 79 (FIGURES 3, 10–12) is integrally formed on head 13 to support one end of a spring 276. A protruding lug 81 is provided on the side opposite arm 79 for attaching an operating link and a downwardly extending lobe 82 is incorporated to support a stop element. As will be set forth these elements cooperate to provide bias on the cutter assembly 14 toward the fruit.

The rotating cutter assembly 14 comprises essentially a yoke 86 serving as a support for a vertically disposed drive shaft 87, shaft housing 86 and peeling cutter assembly 89. Y-shaped member 86 includes a pair of upwardly diverging fingers 91 and 92 which terminate respectively in hub-shaped ends 93 and 94 for pivotal mounting on head member 13. A headed pin 96 passes through hub 93 into bore 76 where it is held by a set screw 97. A partially threaded pin 98 passes through opposing hub 94 and is similarly anchored in bore 76. One or more compression washers 99, a yoke wear clip member 101, a bearing washer 102 and a lock nut 103 are assembled on pin 98. These are assembled in such manner, as will be set forth hereinafter in detail, that a drag or dampening action is provided on the cutter assembly.

The lower unitary end 106 of yoke 86 has a vertical bore 107 therethrough to receive shaft housing 88. The yoke also has a pair of outwardly projecting lugs 108 and a screw 109 for adjustably clamping the housing in position. A flanged bushing 111 is fitted into the top end of shaft housing 88 to provide an upper bearing for drive shaft 87 and a collar 112 with set screw 113 is secured to shaft 87 for vertical adjustment. The top extremity 49 of drive shaft 87 is of square configuration to permit a sliding fit with the square recess 48 in fitting 47 of the flexible drive assembly 43.

The Peeling Mechanism

The peeling cutter assembly 89 is mounted on the bottom of shaft housing 88 as is shown in FIGURE 8. A bushing 116 fits in a counterbore 117 in housing 88 to act not only as a bearing for shaft 87 but also as a spacer and end thrust bearing. The lower extremity of shaft 87 is stepped down in diameter and threaded at 117 to provide for mounting a bearing washer 118, rotary peeling knife 119 and lock nut 121. An outwardly flanged, exteriorly threaded sleeve 122 is affixed as by welding to housing 88 to provide for adjustably mounting a guard member 123, secured by a washer and nut 124. The guard 123 is of an inverted dish shape having a central planar portion 126, center hole 127 and a downwardly depending rim 128, with a segment cutaway as at 129 to provide for controlled egress of the peelings. The guard 123 is adjustably positioned with respect to rotary knife 119 so that the depth of cut of the knife can be altered and controlled.

The rotary knife element 119 is formed with a central planar portion 131 for attachment to drive shaft 87, an intermediate arcuate portion 132 and an upturned annular rim 133. The edge 134 of rim 133 is tapered and serrated to provide the necessary knife cutting surfaces for peeling a pear. The rim 133 is provided at such an angle to the planar portion 131 that only the cutting edge of the rim contacts the fruit at any time. This angle is at least 155° and is preferably about 150°. What is desired is that the rim not ride on the fruit. If this occurs, one will not have the proper peeling action of the knife. This desired result can also be attained by cutting the teeth in the rim to extend the full height of the rim with the root or base of the tooth so that any guard action by the bottom outer edge of the cutter is absent.

It is a feature of the knife construction that the peel is in the form of a spiral strip of the pear skin rather than a series of chips. The spiral peel breaks up into short lengths which are readily handled in large bulk by conventional sewage disposal means whereas the chips are not.

Movement of the Peeling Mechanism

As previously stated, the peeling head assembly 13 is supported on post 12 rotatably mounted in bracket fitting 11 bolted to angle 26 of carrier element B. A link assembly 141 is connected between head 13 and a point on reciprocating carrier element A to rotate head 13 about support post 12 when carrier A is moved relative to carrier B. The link assembly 141 comprises a threaded connecting rod 142 having socket fittings 143 adjustably mounted on each end. The fittings are engaged with ball head bolts 144 affixed to lug 81 on head 13 and to rearwardly extending flange 146 of carrier A. Thus, forward movement of carrier A with carrier B stationary, causes rotation of head 13 in a clockwise direction (as viewed from above) thus directing the depending cutter assembly 14 in an arcuate path for approximately 100° of revolution, at which point a lost motion connection between carriers A and B becomes operative and the two carriers move forward concurrently, causing the cutter assembly 14 to follow a straight line path for the remainder of the stroke.

Fore and aft movement of carrier elements A and B is controlled by a cam affixed to the main drive shaft 1047 of the basic processing machine. A reciprocating rod 151 is slideably mounted in axially aligned fore and aft bearings 152 and 153 fixed to the two end support members of the main frame 1001. A link 154 is connected between one extremity of rod 151 and the upper end of a crank arm 156 positioned by a cam track and follower arrangement to operate the rod in phase with other elements of the processing machine.

Rigidly fastened to the forward end of each rod 151 is a support fitting 161 incorporating a forwardly extending mounting bracket 162 to which transverse carrier element A is secured by bolts 163. Carrier A may be fabricated of a pair of back-to-back angle bars 164 and 165 welded or otherwise fastened together at intervals to act as a unitary member extending between rods 151.

Slideably fitted on rod 151 between fitting 161 and bearing 152 is an elongated sleeve fitting 166 incorporating a laterally offset bracket portion 167 to which carrier element B is secured with bolts 168. Carrier B comprises essentially a heavy angle cross bar 26 to which are bolted peeling head support fittings 11 and cutter displacement support brackets 27. Flexible connections 171 are provided at each end of cross bar 26 to preclude any possibility that misalignment or disparity of movement of reciprocating drive rods 151 or bending deflections in carrier B could cause friction or binding during reciprocation of the mechanism.

Flexible connections 171 comprise a short section of angle bar 172, a slotted intermediate mounting plate 173, a lower retainer plate 174 and a sliding block member (not shown), to permit limited movement of cross bar 26.

The Carrier Mechanism

Figures 2, 6:
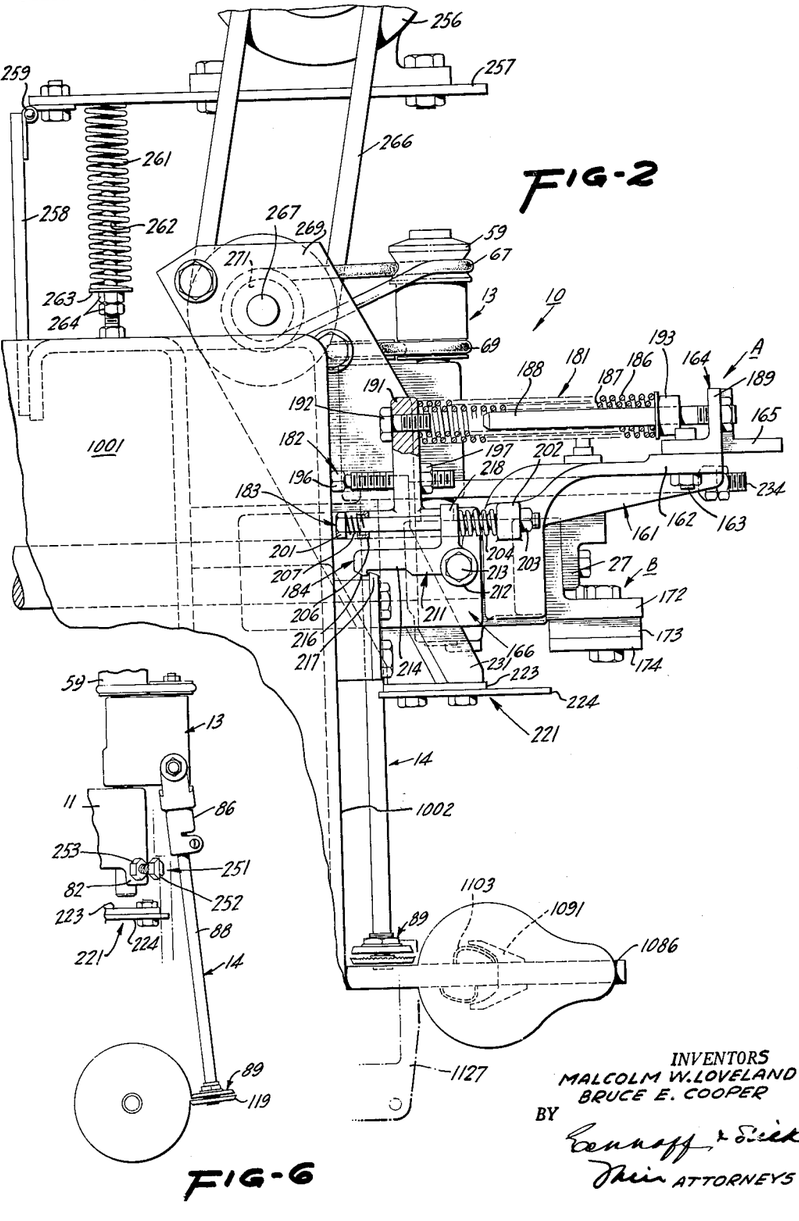
FIGURE 2 is a fragmentary side elevation of the peeling mechanism with its driving means and a portion of the processing machine structure on which it is mounted.
FIGURE 6 is an elevation illustrating the relationship between the cutter assembly, the safety cam plate and the adjustable movement limiting stop.
Figure 3:
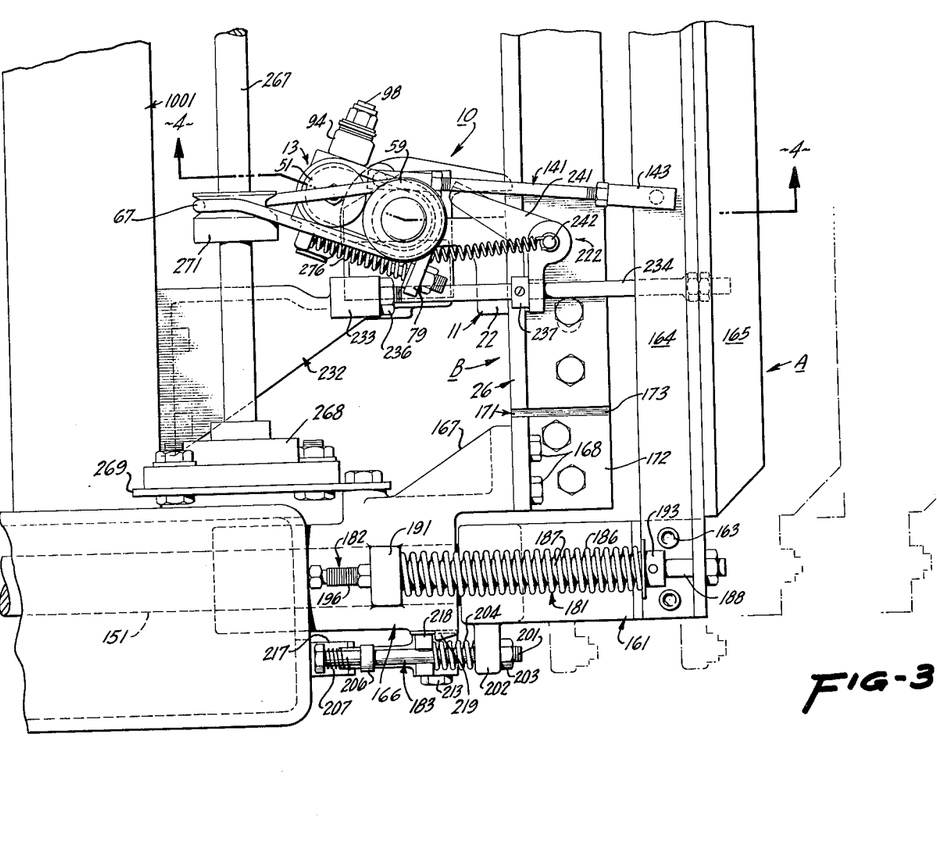
FIGURE 3 is a top plan of the peeling mechanism together with the reciprocating carriers and position controlling linkage.

Control of the relative reciprocating movement of carriers A and B is accomplished through a series of adjustable mechanisms, including a compression spring assembly 181, a stop member 182, an interlocking connecting rod 183 and a safety latch 184. As best shown in FIGURES 2 and 3, compression spring assembly 181 is mounted between carriers A and B to urge these members apart. The assembly 181 comprises two nested springs 186 and 187 positioned coaxially about a horizontal guide rod 188 bolted to upstanding flange 189 of angle bar 164. An integral arm 191 projects vertically from sleeve fitting 166 and has a bolt 192 secured therein to retain one end of springs 186 and 187. A collar 193 is positioned on guide rod 188 to provide for adjustment of the springs' compressive force as required.

Also affixed to arm 191 on sleeve 166 is an adjustable stop member 182 which limits the rearward movement of fittings 166 and, in consequence, the travel of carrier B upon the stop member engaging the forward surface of the end support frame. For this purpose a bolt 196 is screwed into arm 191 below spring assembly 181 and is secured in position after adjustment by lock nut 197. In order to eliminate a sudden impact of the stop member with the main frame, the control cam track contains a small offset to temporarily halt the inward movement of the reciprocating rods 151.

Connecting rod mechanism 183 provides for a lost motion action between carriers A and B, and comprises a bolt member 201 adjustably secured to a lug 202 formed as part of fitting 161 by lock nut 203, a compression spring 204 for biasing of latch 184 and a counterbored collar 206 and light spring 207 to act as a shock absorber for the latch actuation.

Safety latch mechanism 184 is provided to prevent the possibility of damage to the operating elements of the peeling apparatus due to inadvertent forward motion of carrier B prior to sufficient travel of carrier A to rotate cutter head assemblies approximately 90°, to celar the fins and coring knives on the spindle. The latching mechanism 184 comprises a bell crank member 211 having a hub portion 212 pivotally fastened to sleeve fitting 166 by bolt 213, one arm 214 having a hooked end 216 for cooperation with a latch member 217 bolted to the front wall of the support frame, and the other arm 218 being bifurcated to envelop the shank of bolt 201.

Operation of the Carriers

Assuming an idle position in the cycle of machine operation with the reciprocating actuating rod 151 and the carriers A and B in the rearmost position, the relative motions of the mechanisms will be described.

Initial outward movement of rod 151 and attached fitting 161 impels carrier A to the right as seen in FIGURE 2. Frictional contact of support fitting 166 on rod 151 would normally cause carrier B to move concurrently; however, since fitting 166 is constantly urged away from fitting 161 by the expansion force of spring assembly 181, the rear carrier remains stationary until the interconnecting mechanism 183 becomes effective to force the fittings 161 and 166 and their attached carriers A and B to move simultaneously.

During the initial phase of this movement, the under surface of the head of bolt 201 presses spring 207 and collar 206 toward arm 218 of bell crank latch member 211, and continued motion causes a small clockwise rotation of latch 211, thus moving hook end 216 upward out of its engaged position. During this motion, bolt 201 has compressed spring 207 into a counterbore in collar 206 and arm 218 is forced against a projection 219 on sleeve fitting 166, resulting in direct transmission of the pulling force of bolt 201 to fitting 166 causing the two carriers A and B to move concurrently during further outward travel.

The Protective Cam Mechanism

An adjustable protective cam assembly 221 is provided to guide the peeling cutter safely around the fins and coring knives mounted on the spindle during, for example, the return stroke of the machine, operation of the machine without a pear on a spindle or when, accidentally, a pear is not correctly impaled on the spindle. Associated with this cam means is a thrust mechanism 222 to push the cutter assembly 14 out of the way when a pear is discharged from the spindle after processing.

The protective cam assembly 221 (shown in FIGURES 2, 4, 6 and 12) comprises a mounting plate 223 having a cam guide plate 224 pivotally fastened thereto as by rivet 226. A nut 227 is welded to the upper surface of plate 223 to provide for a screw 228 which passes through an opening 225 in cam 224 to secure the cam in the desired position in accordance with the size of coring spindle being used. The cam assembly 221 is adjustably bolted to a downwardly extending portion 231 of a bracket fitting 232 affixed to the forward wall of the processing machine. The outer edge of cam plate 224 is partially arcuate and partially straight and serves as a bearing surface for the shaft housing 88 of cutter assembly 14 to prevent the possibility of the cutter knife 119 engaging the coring spindle.

Bracket fitting 232 also incorporates an integral hub-shaped projection 233 on the upper surface of the fitting above the downwardly extending portion 231. A forwardly extending rod 234 is screwed into a bore in projection 233 and is secured by nut 236. A slideable collar 237 is centrally fastened on rod 234 by a set screw 238. A pair of nuts 239 are locked on the outer end of rod 234 to operate bell crank member 241 of thrust mechanism 222 to move the cutter assembly 14 aside during discharge of a pear. Bell crank 241 is journalled on a vertical shaft 242 supported in the bracket fitting 27 bolted to angle bar 26 of carrier B. The bell crank member 241 is formed with a central hub portion 243 having a bore therethrough to fit shaft 242, a bifurcated lever arm 244 which envelops rod 234 between collar 237 and nuts 239, and a second arm 246 having a protuberance 247 thereon.

Figure 10:
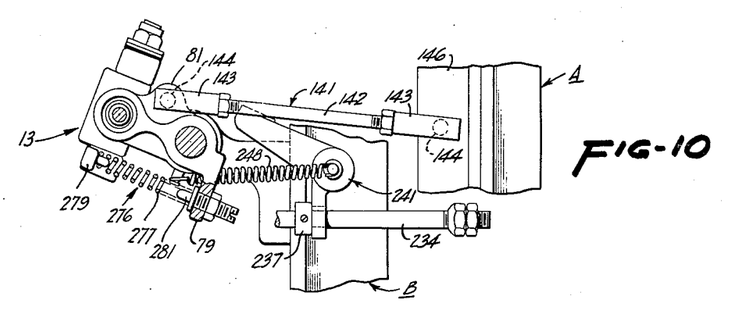
FIGURES 10, 11 and 12 are top views illustrating the sequence of movements and relationship of the peeling mechanism to the carriers and linkage, as well as the protective cam plate.
Figure 11:
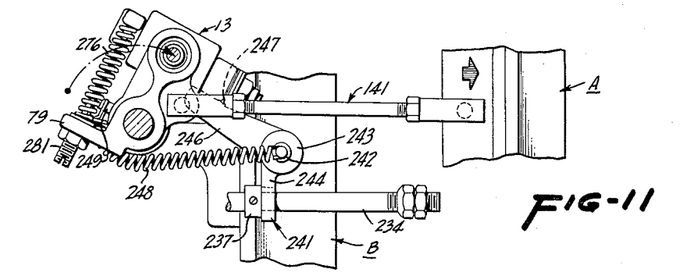
Figure 12:
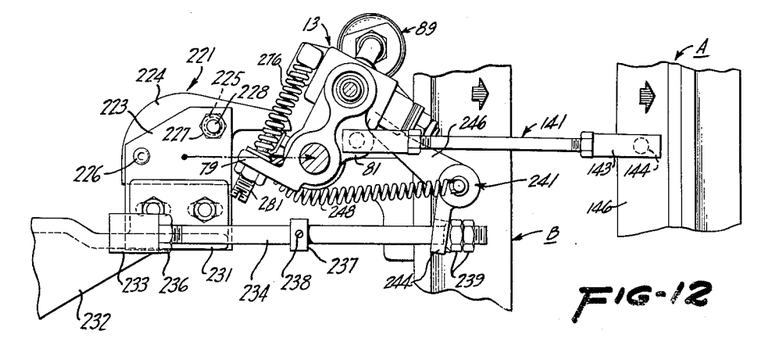
Figure 13:
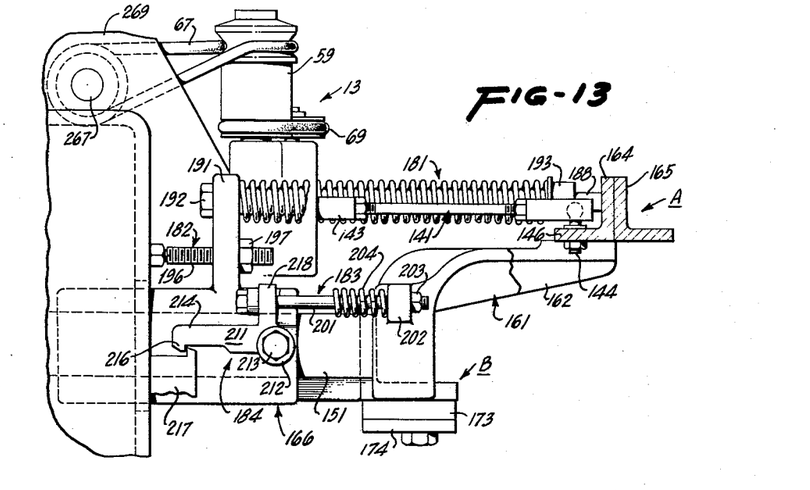
FIGURES 13 and 14 are partial side views of the peeling mechanism positioned as shown respectively in FIGURES 11 and 12, illustrating the operating of the safety latch device.
Figure 14:
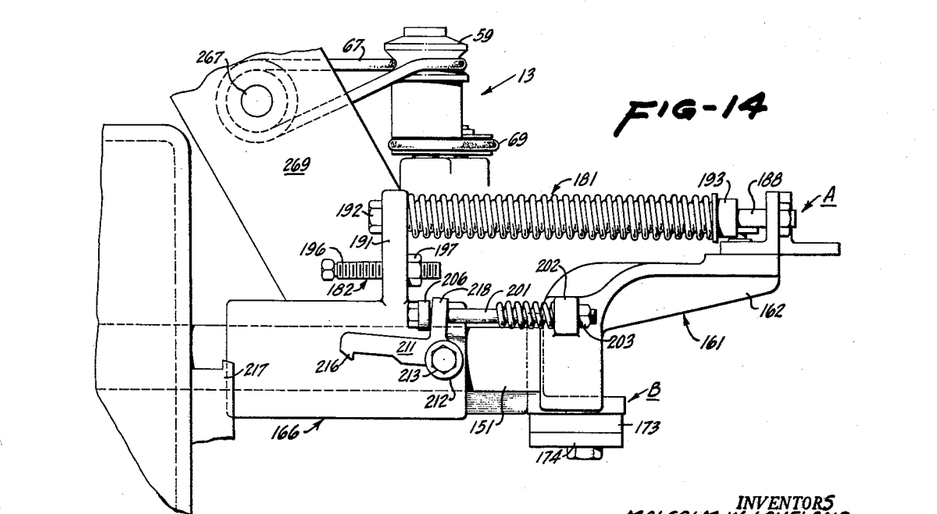

As the carriers A and B move forward from the position shown in FIGURE 11 to that of FIGURE 12, it will be apparent that the bifurcated arm 244 will slide along stationary rod 234 without hindrance until it strikes nuts 239, at which time bell crank 241 is rotated clockwise with protuberance 247 of arm 246 engaging the yoke wear clip 101 to cause the cutter assembly to swing away from the spindle during discharge of a processed pear. Conversely, when carrier B is in its aft position, as shown in FIGURES 10 and 11, collar 237 prevents accidental rotation of bell crank 241 to preclude interference with the cutter shaft assembly 14. A tension spring 248 is connected between the top extremity of shaft 242 and a pin 249 fixed in peeling head member 13 to bias the assembly in a counter-clockwise direction and to provide a dampening action against possible vibration.

An adjustable guide stop member 251 is supported at the bottom of peeling head member 13 and, as best shown in FIGURE 6, comprises a bolt 252 screwed into downwardly extending lobe 82 with nut 253 for locking the bolt in position. Stop 251 is adjusted to engage the cutter shaft housing 88 to prevent the peeling knife 119 from engaging the spindle during the straight line portion of the forward travel of the cam guide plate 224.

The Drive for the Peeling Mechanism

Power for rotating the peeling knives 119 is supplied by motor 256 mounted on a horizontal support plate 257, pivotally fastened at one end to a vertical plate member 258 through hinge 259, and having a vertically disposed compression spring 261 provided to insure constant tension in the main drive belt. Spring 261 is positioned about a vertical guide rod 262 rigidly affixed to the top of the end support frame and, as best shown in FIGURE 2, includes a bearing washer 263 and nuts 264 for locking the assembly in position for power transmission.

A main drive belt 266 from motor 256 rotates a transverse drive shaft 267 which is journalled in bearings 268 on hangers 269 affixed to sleeve fittings 116. Pulleys 271 are secured to shaft 267 at each peeling head assembly 13 to provide for drive belts 67 reeved in groove 66 to rotate pulley elements 59. A short belt 69 is reeved around groove 68 in pulley 59 and pulley 51 to rotate flexible drive assembly 43 and peeling knife 119. It should be noted that the peeling cutter assemblies are rotated continuously while the processing machine is in operation, even through some of the various mechanisms are operated intermittently.

The Protection of the Peeling Mechanism

Certain limitations of movement of the peeling cutter assembly have been found to be both advantageous and desirable for speed and efficiency of operation as well as for mechanical considerations. For example, because of the removal of either a cylindrical core plug from cocktail pears or a conical section from canning pears, it is unnecessary that the cutter travel completely to the center line of the calyx end of the pear. Also, trimming of the stem end avoids the necessity for arcuate travel of the cutter at the stem end of the pear.

In view of the foregoing, the most rearward position of peeling head member 13 is such that a vertical plane passed through the axis of post 12 and cutter assembly 14 will be at an angle of approximately 18° to a plane passed through post 12 and the axis of the coring spindle. From this rearward position, the cutter head assembly is rotated through approximately 100° to the average point of juncture between the spherical portion and the neck portions of the pear being processed. At this point, the head assembly then is moved forwardly in a straight line path.

Figure 15:
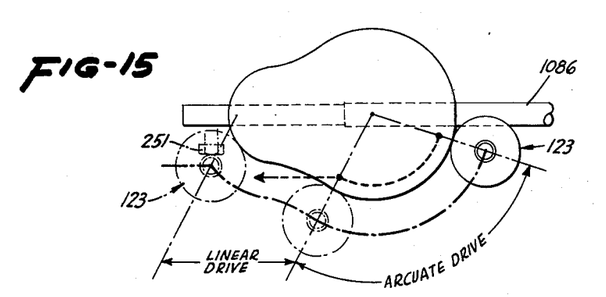
FIGURES 15, 16 and 17 are schematic views illustrating the travel of the cutter relative to the spindle on which the fruit is carried.
Figure 16:
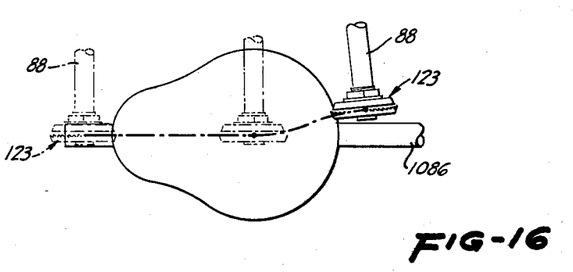
Figure 17:
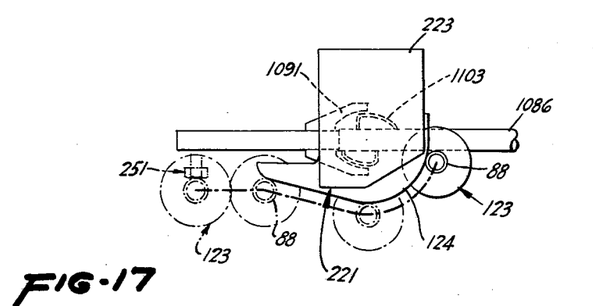

The above motions are further illustrated in FIGURES 15, 16 and 17 in which FIGURE 15 is a plan view showing the motion of the cutter about the fruit as viewed from a point above the fruit. FIGURE 16 corresponds to FIGURE 15 but shows the motion of the cutter relative to the fruit as viewed from the side. FIGURE 17 illustrates the travel of the cutter when the spindle 1086 is bare. As appears in FIGURE 15, the cutter starts at the calyx end of the fruit and from a position in which the cutter extends over the spindle 1086. The cutter then moves forwardly and downwardly over an arcuate path. When a pear is positioned on the spindle 1086 the actual path is defined by the contour of the fruit. When the spindle 1086 is bare, however, the protecting cam 223 forces the cutter housing to travel through an arcuate path so that the cutter cannot come into engagement with the seed-pod cutter 1103 or the fins 1091. The arcuate portion of the cutter travel extends through about 100° as viewed in FIGURE 15 following which it follows a linear path. The effect of the cam slot 31 and cam follower 32 in raising and lowering the cutter is shown in FIGURE 16. Note that at the calyx end of the fruit, the cutter is raised into a position into which it is over the coring spindle 1086 to effect peeling of the calyx end of the fruit, the cutter moving downwardly as it moves forwardly over the fruit into a position in which the knives on the cutter are substantially in alignment with a horizontal plane passed through the longitudinal axis of the spindle 1086.

Operation of the Peeling Mechanism

It has been found desirable that the cutter knife should be urged against the skin of the pear with a controlled pressure for most satisfactory peeling operations. This action is accomplished through a compression spring assembly 276 acting between support head 13 and rotating cutter assembly 14. The spring assembly 276 comprises a compression spring 277 having one end located by a pin on an upwardly extending lever arm 279 integral with hub 93 of yoke 86, and the other end located about the end of flanged screw member 281, adjustably locked in position on laterally projecting lever arm 79 on head 13. Thus, adjustment of screw member 281 enables one to control and alter the pressure of the cutter against the surface of the pear.

The pears handled on a pear processing machine cannot be handpicked or graded. They will therefore include pears having irregular skin surfaces or be blemished by protuberances or pits. To avoid skipping action of the cutter or severe digging of the cutter into the flesh of the pear upon encountering such a pear, we have provided a dampener mechanism to smooth out the travel of the cutter. This mechanism is installed between the rotating cutter assembly and the cutter head to provide a slight resistance on the freedom of swinging movement of yoke 86 relative to head assembly 13. The dampener mechanism comprises one or more compression washers 99, a yoke wear clip 101, a bearing washer 102 and a lock nut 103 assembled on pin 98 secured in bore 71. The wear clip 101 includes a pair of flange elements fitting around finger 92 of yoke 86 and it will be seen that tightening of lock nut will increase the friction in the support assembly and serve as a retardation against any sudden change of angle of the cutter support assembly.

We claim:

1. In a pear peeler having a rotatably mounted core tube for insertion into a pear from the calyx and along the stem-calyx axis thereof; a cutter mechanism for peeling a pear impaled along said axis on said core tube, said cutter mechanism consisting of a circular knife having a central circular planar portion and a flanged rim flaring outwardly from said central portion and providing a cutting edge; a shaft; means mounting the circular knife on an end of the shaft; a tube supporting the shaft for rotation and extending intermediate the ends of the shaft; means for rotating the shaft; means for moving said tube axially toward and away from said core tube means supporting said tube for pivotal movement whereby the knife is permitted to move substantially radially toward and away from the surface of a pear impaled on the core tube as the diameter of the pear undergoing peeling varies; a guard mounted on an end of the tube and having a flanged rim cooperatively adjacent the cutting edge on the circular knife to provide a gauge for the depth of cut made by the knife, the central circular portion and the flanged rim on said guard extending over only a portion of the cutter to provide an opening for escape of peelings cut by the knife; and means cooperating with said means for moving said tube axially toward and away from said core tube for moving said cutter mechanism from a first position in which the circular knife overlies said core tube and is engaged with the calyx end of a pear on said core tube to a second position in which the cutting edge on said knife is engaged with a pear on said core tube and said cutting edge extends substantially in a horizontal plane extending through the longitudinal axis of the core tube, said knife then being moved along said pear substantially in said plane to the stem end of the pear, the movement of the circular knife from the first position to the second being both a downward movement over the calyx end of the pear and a forward movement along the longitudinal axis of the pear to move the cutting edge of said knife into said horizontal plane while the knife is still engaged with the calyx end of the pear.

2. In a pear peeler having a rotatably mounted core tube for insertion into a pear from the calyx end along the stem-calyx axis thereof; a cutter mechanism for peeling a pear impaled along said axis on said core tube, said cutter mechanism consisting of a circular knife having a central circular planar portion and a flanged rim flaring outwardly from said central portion and providing a cutting edge; a shaft; means mounting the circular knife on an end of the shaft; a tube supporting the shaft for rotation and extending intermediate the ends of the shaft; means for rotating the shaft; means for moving said tube axially toward and away from said core tube means supporting said tube for pivotal movement whereby the knife is permitted to move substantially radially toward and away from the surface of a pear impaled on the core tube as the diameter of the pear undergoing peeling varies; a guard mounted on an end of the tube and having a flanged rim cooperatively adjacent the cutting edge on the circular knife to provide a gauge for the depth of cut made by the knife, the central circular portion and the flanged rim on said guard extending over only a portion of the cutter to provide an opening for escape of peelings cut by the knife; means cooperating with said means for moving said tube axially toward and away from said core tube for moving said cutter mechanism from a first position in which the circular knife overlies said core tube and is engaged with the calyx end of a pear on said core tube to a second position in which the cutting edge on said knife is engaged with a pear on said core tube and said cutting edge extends substantially in a horizontal plane extending through the longitudinal axis of the core tube, said knife then being moved along said pear substantially in said plane to the stem end of the pear, the movement of the circular knife from the first position to the second being both a downward movement over the calyx end of the pear and a forward movement along the longitudinal axis of the pear to move the cutting edge of said knife into said horizontal plane while the knife is still engaged with the calyx end of the pear; means constantly urging the knife into engagement with the surface of a pear impaled on said core tube; and means providing a drag on the pivotal movement of the tube to oppose partially radial movement of the knife whereby free oscillation of the cutter relative to the fruit caused by any irregularities on the surface of the pear undergoing peeling is damped to provide a reluctance to free movement of the cutter.

3. In a pear peeler having a rotatably mounted core tube for insertion into a pear from the calyx end along the stem-calyx axis thereof; a cutter mechanism for peeling a pear impaled along said axis on said core tube, said cutter mechanism consisting of a circular knife having a central circular planar portion and a flanged rim flaring outwardly from said central portion and providing a cutting edge; a shaft; means mounting the circular knife on an end of the shaft; a tube supporting the shaft for rotation and extending intermediate the ends of the shaft; means for rotating the shaft; a mounting bracket; an upwardly extending shaft mounted for rotational and axial sliding movement in said bracket; a cutter mechanism support member secured to said upwardly extending shaft; means mounting said tube on the support member for pivotal movement whereby the knife is permitted to move substantially radially toward and away from the surface of a pear impaled on the core tube as the diameter of the pear undergoing peeling varies; a guard mounted on an end of the tube and having a flanged rim cooperatively adjacent the rim on the circular knife to provide a gauge for the depth of cut made by the knife, the central circular portion and the flanged rim on said guard extending over only a portion of the cutter to provide an opening for escape of peelings cut by the knife; an S-shaped cam slot provided in said mounting bracket; and a pin movable in said slot and secured to said upwardly extending shaft for moving said upwardly extending shaft from a first position in which the circular knife overlies said core tube and is engaged with the calyx end of a pear on said core tube to a second position in which the cutting edge on said knife is engaged with a pear on said core tube and said cutting edge extends substantially in a horizontal plane extending through the longitudinal axis of the core tube, said knife then being moved along said pear substantially in said plane to the stem end of the pear, the movement of the circular knife from the first position to the second being both a downward movement over the calyx end of the pear and a forward movement along the longitudinal axis of the pear to move the cutting edge of said knife into said horizontal plane while the knife is still engaged with the calyx end of the pear.

4. In a pear peeler having a rotatably mounted core tube for insertion into a pear from the calyx end along the stem-calyx axis thereof; a cutter mechanism for peeling a pear impaled along said longitudinal axis on said core tube, said cutter mechanism consisting of a circular knife having a central circular planar portion and a flanged rim extending outwardly from said central portion and providing a cutting edge; a shaft; means mounting the circular knife on an end of the shaft; a tube supporting the shaft for rotation and extending intermediate the ends of the shaft; means for rotating the shaft; a mounting bracket; an upwardly extending shaft mounted for rotational and axial sliding movement in said bracket; a support member secured to said upwardly extending shaft; means mounting the tube pivotally on the support member, including a Y-shaped yoke on the end of said tube; a spring engaged with an arm of said Y-shaped yoke to urge said mounting means to move the circular knife into engagement with a pear impaled on said core tube; friction drag means applying a resistive force between the support member and the yoke whereby free movement of the knife in either direction is damped; means supporting said tube for pivotal movement whereby the knife is permitted to move substantially radially toward and away from the surface of a pear impaled on the core tube as the diameter of the pear undergoing peeling varies; a guard mounted on an end of the tube and having a flanged rim cooperatively adjacent the rim on the circular knife to provide a gauge for the depth of cut made by the knife, the central circular portion and the rim on said guard extending over only a portion of the cutter to provide an opening for escape of peelings cut by the knife; an S-shaped cam slot provided in said mounting bracket; and a pin movable in said slot and secured to said upwardly extending shaft for moving said upwardly extending shaft from a first position in which the circular knife overlies said core tube and is engaged with the calyx end of a pear on said core tube to a second position in which the cutting edge on said knife is engaged with a pear on said core tube and said cutting edge extends substantially in a horizontal plane extending through the longitudinal axis of the core tube, said knife then being moved along said pear substantially in said plane to the stem end of the pear, the movement of the circular knife from the first position to the second being both a downward movement over the calyx end of the pear and a forward movement along the longitudinal axis of the pear to move the cutting edge of said knife into said horizontal plane while the knife is still engaged with the calyx end of the pear.

5. In a pear peeler having a rotatably mounted core tube for insertion into a pear from the calyx end along the stem-calyx axis thereof; a cutter mechanism for peeling a pear impaled along said axis on said core tube, said cutter mechanism consisting of a circular knife having a central circular planar portion and a flanged rim flaring outwardly from said central portion and providing a cutting edge; a shaft; means supporting said shaft for rotation and for axial movement toward and away from the said core tube; means mounting the circular knife on an end of the said shaft; means for rotating the shaft; means supporting said shaft for pivotal movement whereby the knife is permitted to move substantially radially toward and away from the surface of a pear impaled on the core tube as the diameter of the pear undergoing peeling varies; and means cooperating with said means for moving said shaft axially toward and away from the said core tube for moving said cutter mechanism from a first position in which the circular knife overlies said core tube and is engaged with the calyx end of the pear on said core tube to a second position in which the cutting edge on said knife is engaged with a pear on said core tube and said cutting edge extends substantially in a horizontal plane extending through the longitudinal axis of the core tube, said knife being moved along said pear substantially in said plane to the stem end of the pear, the movement of the circular knife from the first position to the second being both a downward movement over the calyx end of the pear and a forward movement along the longitudinal axis of the pear to move the cutting edge of the said knife into said horizontal plane while said knife is still engaged with the calyx end of the pear.

6. In a pear peeler having a rotatably mounted core tube for insertion into a pear from the calyx end along the stem-calyx axis thereof; a cutter mechanism for peeling a pear impaled along said axis on said core tube, said cutter mechanism consisting of a circular knife having a central circular planar portion and a flanged rim flaring outwardly from said central portion and providing a cutting edge; a shaft; means supporting said shaft for rotation and for axial movement toward and away from the said core tube; means mounting the circular knife on an end of the said shaft; means for rotating the shaft; means supporting said shaft for pivotal movement whereby the knife is permitted to move substantially radially toward and away from the surface of a pear impaled on the core tube as the diameter of the pear undergoing peeling varies; means cooperating with said means for moving said shaft axially toward and away from the said core tube for moving said cutter mechanism from a first position in which the circular knife overlies said core tube and is engaged with the calyx end of the pear on said core tube to a second position in which the cutting edge on said knife is engaged with a pear on said core tube and said cutting edge extends substantially in a horizontal plane extending through the longitudinal axis of the core tube, said knife being moved along said pear substantially in said plane to the stem end of the pear, the movement of the circular knife from the first position to the second being both a downward movement over the calyx end of the pear and a forward movement along the longitudinal axis of the pear to move the cutting edge of the said knife into said horizontal plane while said knife is still engaged with the calyx end of the pear; means constantly urging said cutting edge into engagement with the surface of a pear impaled on said core tube; and means providing a drag on the pivotal movement of the shaft to oppose partially radial movement of the shaft whereby free oscillation of said cutting edge relative to the fruit caused by any irregularities on the surface of the pear undergoing peeling is damped to provide a reluctance to free movement of the cutting edge.

7. In a pear peeler having a rotatably mounted core tube for insertion in a pear along the stem-calyx axis thereof: a supporting element for a cutter mechanism; a cutter mechanism for peeling said pear so impaled, said cutter mechanism having a rotatably and pivotally mounted shaft, said shaft having a circular knife secured to one end thereof; means mounting said shaft to said supporting element for pivotal movement, said means comprising a yoke having two fingers joined together at the apex of a V, said yoke supporting at the apex of the said V one end of the said rotatably and pivotally mounted shaft, said yoke being mounted for pivotal movement at the tips of the fingers thereof to the said cutter mechanism-supporting element by means of pins extending outwardly from opposite sides of the said supporting element whereby said knife may move substantially radially toward and away from the said core tube as the surface of the pear impaled on said core tube changes in radius; means constantly urging said knife into engagement with the surface of the pear so impaled; and adjustable means for providing a drag on the movement of the said yoke to oppose partially radial movement of the yoke, shaft and knife whereby free oscillation of the knife relative to the pear caused by any irregularities on the surface of a pair undergoing peeling is damped and reluctance to free movement of the knife is provided, said drag means comprising a metal element secured adjacent one of said pins to one finger of the said yoke for pivotal movement with the said yoke, said last mentioned pin having adjustable means on the end thereof for exerting pressure on the said metal element and thereby on the said yoke, whereby to vary the frictional drag between said adjustable means and said metal element.

References Cited in the file of this patent

UNITED STATES PATENTS

| | | |
|---|---|---|
| 2,664,129 | Coons | Dec. 29, 1953 |
| 2,891,591 | Boyce | June 23, 1959 |
| 3,013,595 | Boyce | Dec. 19, 1961 |